(12) United States Patent
Inaguchi

(10) Patent No.: US 9,457,445 B2
(45) Date of Patent: Oct. 4, 2016

(54) MACHINE TOOL WITH COVER ADAPTED FOR DISCHARGE OF CHIPS

(71) Applicant: FANUC Corporation, Yamanashi (JP)

(72) Inventor: Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 127 days.

(21) Appl. No.: 14/181,271

(22) Filed: Feb. 14, 2014

(65) Prior Publication Data
US 2014/0241824 A1    Aug. 28, 2014

(30) Foreign Application Priority Data
Feb. 26, 2013  (JP) ................................. 2013-036137

(51) Int. Cl.
*B23Q 11/08*   (2006.01)
*B23Q 11/00*   (2006.01)

(52) U.S. Cl.
CPC ........... *B23Q 11/08* (2013.01); *B23Q 11/0053* (2013.01); *B23Q 11/0891* (2013.01); *Y02P 70/171* (2015.11); *Y10T 409/30392* (2015.01); *Y10T 409/304088* (2015.01)

(58) Field of Classification Search
CPC .............. B23Q 11/08; B23Q 11/0875; B23Q 11/0891; B23Q 11/0053; Y10T 409/304088; Y10T 409/30392
USPC .................................................. 409/137, 134
See application file for complete search history.

(56) References Cited

U.S. PATENT DOCUMENTS

| | | | |
|---|---|---|---|
| 2,652,737 A * | 9/1953 | Longstreet ....................... 82/152 |
| 5,263,800 A * | 11/1993 | Chen .............................. 409/137 |
| 6,210,086 B1 * | 4/2001 | Lecornet et al. ............. 409/137 |
| 2002/0028118 A1 * | 3/2002 | Laur et al. .................... 409/132 |
| 2003/0066179 A1 * | 4/2003 | Shiba et al. ................... 29/426.3 |
| 2003/0185641 A1 * | 10/2003 | Tanigawa ..................... 409/134 |
| 2005/0069392 A1 * | 3/2005 | Fujiwara ....................... 409/137 |
| 2005/0126887 A1 * | 6/2005 | Nisiguchi ..................... 198/495 |
| 2006/0056931 A1 * | 3/2006 | Schweizer et al. ........... 409/137 |
| 2008/0267723 A1 | 10/2008 | Tezuka et al. |
| 2010/0221082 A1 * | 9/2010 | Meidar et al. ................ 409/137 |

FOREIGN PATENT DOCUMENTS

| EP | 1317993 A2 * | 6/2003 | ............. B23Q 11/08 |
|---|---|---|---|
| EP | 1413393 A2 * | 4/2004 | ......... B23Q 11/0891 |
| EP | 1950004 A1 * | 7/2008 | ............. B23Q 11/08 |

(Continued)

OTHER PUBLICATIONS

Office Action mailed Aug. 19, 2014, corresponding to Japanese patent application No. 2013-036137.

*Primary Examiner* — Sunil K Singh
*Assistant Examiner* — Ryan Rufo
(74) *Attorney, Agent, or Firm* — Hauptman Ham, LLP

(57) ABSTRACT

A machine tool has a cover comprising a front cover and right and left side covers and includes a first slope part between the front cover and a table on which a workpiece is placed. The first slope part has slopes gradually declining from the center of the front cover toward left and right side covers. Further, the machine tool has also a second slope part that is connected to the left and right lower ends of the first slope part and has slopes declining rearward relative to the machine tool from the side of the front cover. If chips produced by machining are deposited on the surface of the first slope part, they are discharged onto the second slope part and into a contaminated fluid tank by a cutting fluid supplied from a nozzle.

10 Claims, 4 Drawing Sheets

(56) References Cited

FOREIGN PATENT DOCUMENTS

| JP | 60175541 U | 11/1985 |
| JP | 1110036 U | 7/1989 |
| JP | 06-091457 A * | 4/1994 | ............... B23Q 1/02 |
| JP | 10-94940 A | 4/1998 |
| JP | 2008-183652 A | 8/2008 |
| JP | 201082771 A | 4/2010 |
| WO | WO 03/026842 A1 * | 4/2003 | ......... B23Q 11/0891 |

* cited by examiner

MACHINE TOOL WITH COVER ADAPTED FOR DISCHARGE OF CHIPS

RELATED APPLICATIONS

The present application claims priority of Japanese Application Number 2013-036137, filed Feb. 26, 2013, the disclosure of which is hereby incorporated by reference herein in its entirety.

BACKGROUND OF THE INVENTION

1. Field of the Invention

The present invention relates to a machine tool, and more particularly, to a machine tool with a cover adaptable to the discharge of chips produced by the operation of the machine tool by means of a cutting fluid or a conveyor, whichever is available.

2. Description of the Related Art

In a machine tool, chips produced during machining adhere to or are deposited inside a metal plate cover that covers a machining area or on the surface of another cover component. In order to continue normal use of the machine tool, the adhering or deposited chips must be removed. In doing this, the chips are generally washed away by a cutting fluid and collected in a cutting fluid supply device.

Japanese Patent Application Laid-Open No. 10-94940 discloses a relevant prior art in which castings of a machine tool are formed with inclined portions and chips are collected by causing a cutting fluid to flow along the inclined portions. Further, Japanese Patent Application Laid-Open No. 2008-183652 discloses a technique in which a splash guard is provided with grooves, a table is surrounded by an inclined groove, and chips are collected by causing a cutting fluid to flow from an elevated part of the groove to a sunken part.

In the technique disclosed in Japanese Patent Application Laid-Open No. 10-94940 described above, however, feed mechanisms for a table are disposed outside side covers and connected to the side surfaces of the table by passing through the side covers. Thus, there are problems of sealing of cutting fluid and production of chips at a portion of the side cover through which the feed mechanism passes through. Since no feed mechanism is located in the center, moreover, the table feed accuracy may possibly be reduced. In the technique disclosed in Japanese Patent Application Laid-Open No. 2008-183652, furthermore, a channel through which the cutting fluid flows is comparatively long, as a result, the inclination of the groove is gentle so that effect of chip discharge is not sufficient.

Further, there is a known method of discharging chips by means of screw conveyors. Since the screw conveyors are installed in exclusively designed spaces, however, they cannot be easily made compatible with their counterparts in the case where no screw conveyors are used.

SUMMARY OF THE INVENTION

Accordingly, in view of the problems of the prior art described above, the object of the present invention is to provide a machine tool with a cover having a simple configuration adapted for the discharge of chips from the interior of the machine tool by means of a cutting fluid or a chip discharge device.

In order to achieve the above object, two slopes that incline left and right from an elevated central part of the bottom surface of the cover that covers the machine tool are provided at the front surface portion of a table. Additional slopes extending in the direction intersecting with those two slopes from a height level below the two slopes are provided on the left and right sides of the cover.

The additional slopes are provided with spaces in which screw conveyors for conveying chips, if any, are installed. If the screw conveyors are used, they are installed in the spaces. If the screw conveyors are not used, space-filling members are attached to form the slopes that incline toward a cutting fluid supply device.

A nozzle for supplying the cutting fluid is disposed on each of the two slopes at the front surface portion of the table and the additional slopes on the left and right sides of the machine tool. The nozzle serves to remove chips deposited on the bottom surface and discharge them into the cutting fluid supply device. Alternatively, the screw conveyors may also be used to discharge chips.

With this configuration, the bottom surface of the cover symmetrically inclines from the center of the front surface portion of the table toward the cutting fluid supply device, so that a channel through which the cutting fluid flows can be shortened and the inclination of the bottom surface can be increased.

If the nozzles for the cutting fluid supply are provided individually for the slopes, moreover, the cutting fluid can be introduced in a direction to discharge chips along the inclination of the bottom surface, so that the capacity and efficiency of chip discharge can be increased. Furthermore, minimum addition of parts can lead to a cost reduction based on common use of parts, without regard to the presence of the screw conveyors, and flexibly meet users' demand.

A machine tool according to the present invention comprises a table on which a workpiece is placed and a column comprising a spindle to be fitted with a tool for machining the workpiece, the table and the spindle being disposed on a bed, a cover comprising a front cover provided on the side opposite the column with the table therebetween, side covers provided individually on the left and right sides of the front cover, and a bottom part connected to the bed through the respective lower ends of the front cover and the side covers, a first slope part provided between the front cover and the table and comprising slopes declining from the center of the front cover toward the left and right side covers, and a second slope part connected to the left and right lower ends of the first slope part and comprising slopes declining rearward relative to the machine tool from the side of the front cover.

The first slope part may be a member capable of being attached to and detached from the bottom part connected to the bed through the lower end of the front cover.

The first slope part may be formed as the bottom part connected to the bed through the front cover.

The second slope part may be a member capable of being attached to and detached from the bottom part connected to the bed through the lower ends of the side covers.

The second slope part may be formed as the bottom part connected to the bed through the side covers. In this case, a chip discharge device may be disposed on the second slope part. Further, an auxiliary member configured to guide chips to the chip discharge device may be disposed near the chip discharge device.

The machine tool may comprise a cutting fluid supply channel through which a cutting fluid is supplied to the first and second slope parts.

According to the present invention, there can be provided a machine tool with a cover having a simple configuration adapted for the discharge of chips from the interior of the machine tool by means of a cutting fluid or a chip discharge device.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
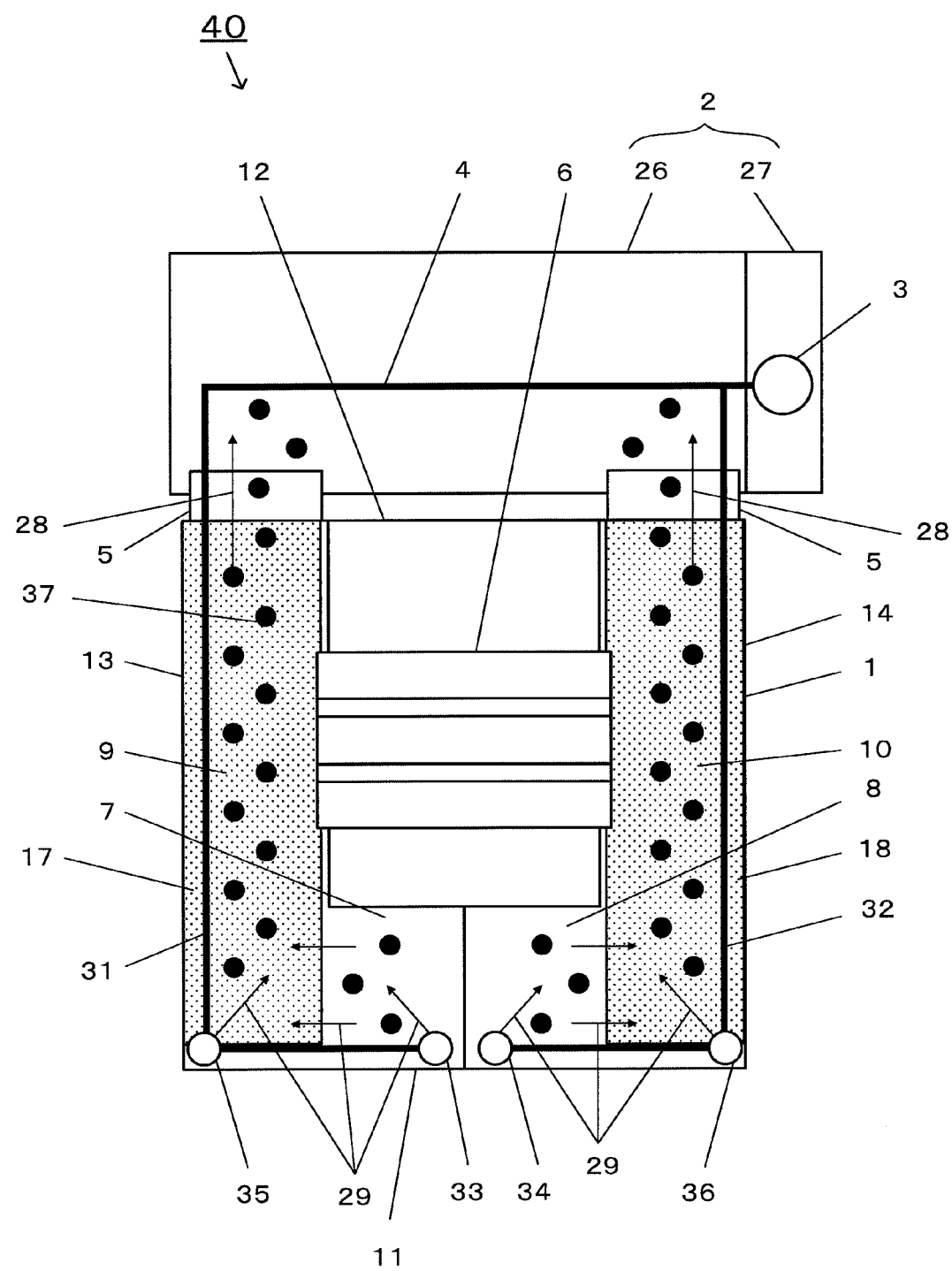
FIG. 1 is a schematic top view of Embodiment 1 of a machine tool according to the present invention.

First, Embodiment 1 of a machine tool according to the present invention will be described with reference to FIGS. 1 and 2.

The machine tool 40 comprises a cover 1 that shields and isolates its machining space from the outside. A table 6 and a column (not shown) are disposed on a bed 50 (FIG. 2). A workpiece 25 is placed on the table 6. The column comprises a spindle 23 to which a tool 24 for machining the workpiece 25 is attached.

Figure 2:
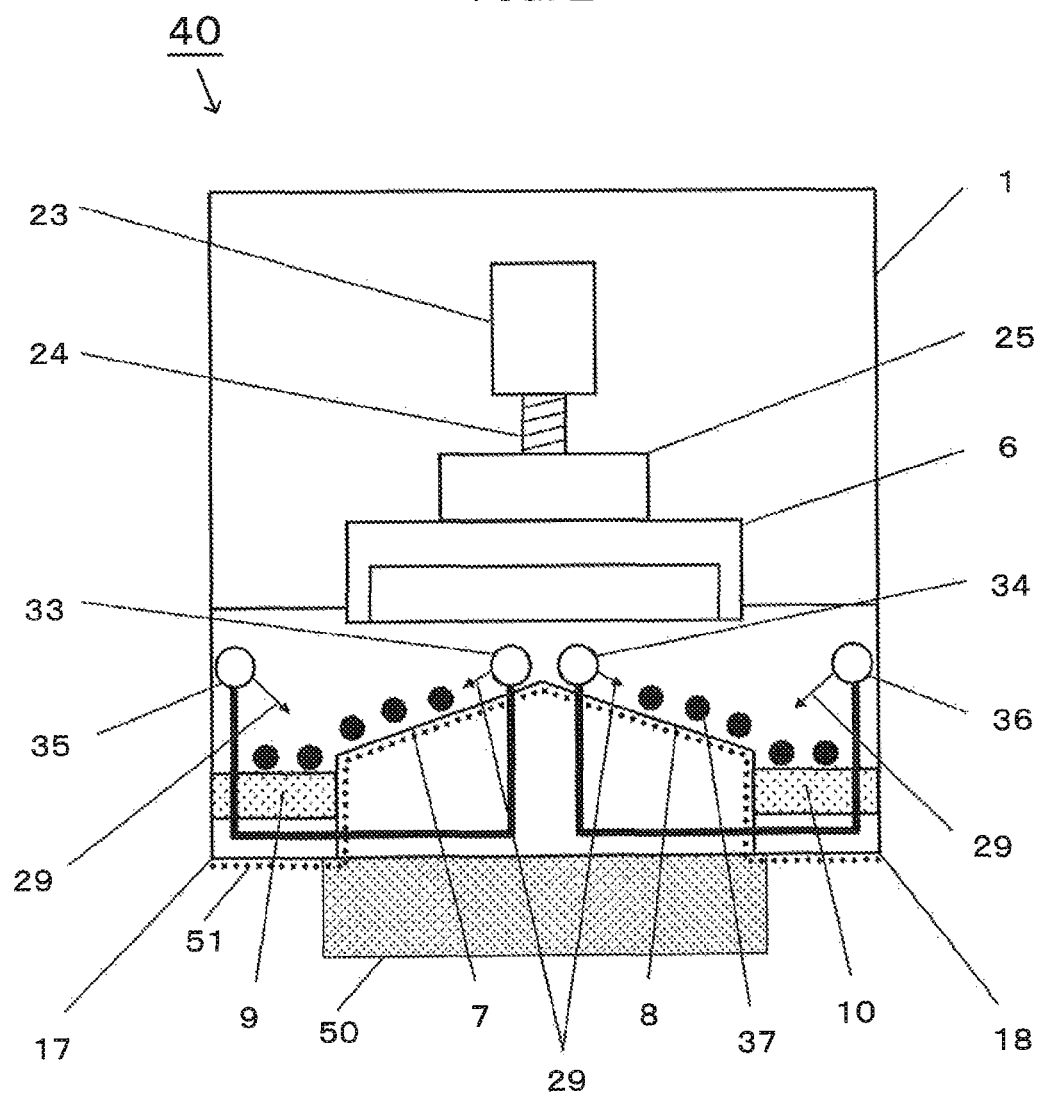
FIG. 2 is a schematic front view of Embodiment 1 of the machine tool according to the present invention.

The cover 1 comprises a front cover 11, left and right side covers 13 and 14 on the left and right sides of the front cover 11, a rear cover 12, and a bottom part 51 (FIG. 2). The front cover 11 is provided on a side opposing the column via the table 6. Further, the bottom part 51 is connected to the bed 50 through the respective lower ends of the front cover 11, left and right side covers 13 and 14, and rear cover 12. The bottom part 51 connected to the bed may be formed integrally with the front cover 11, side covers 13 and 14, or rear cover 12 or formed of a combination of two members.

In the machining space covered by the cover 1, a table 6 is disposed on the bed and a saddle (not shown). The workpiece 25 is placed on the table 6 and machined by the tool 24 attached to the spindle 23 on the top of the column (not shown) set up on the bed. In machining the workpiece 25, the tool 24 and the workpiece 25 are moved relative to each other. Further, first and second slope parts are provided in the machining space covered by the cover 1.

The following is a description of the first second slope part.

The first slope part (comprising first and second lower cover bottom members 7 and 8), which inclines left and right (as viewed in FIG. 1) from the center of the machine tool 40, is disposed on the upper surface of the bottom part of the cover 1 between the front cover 11 and the front surface of the table 6. The first and second lower cover bottom members 7 and 8 that constitute the first slope part may be formed as an integral member or independent members. The first slope part may be formed as a member that can be attached to and detached from the cover 1 or as a bottom part connected to the bed through the front cover 11.

The following is a description of the second slope part.

The second slope part, which comprises slopes declining rearward relative to the machine tool 40 from the front cover 11, is disposed on the left and right sides of the first slope part (or on bottom surfaces on the left side of the first lower cover bottom member 7 and on the right side of the second lower cover bottom member 8).

The second slope part may be composed of left and right space covers 9 and 10, capable of being attached to and detached from the cover 1, or left and right lower cover bottom surfaces 17 and 18, which extend individually as bottom parts of the cover 1 from the left and right side covers 13 and 14, respectively, toward the bed. The cross-section of each of the left and right space covers 9 and 10 is not limited to a rectangular shape and may alternatively be in a semi-circular shape, trough shape, or another shape. The second slope part is connected to the left and right lower ends of the first slope part and comprises slopes declining rearward relative to the machine tool 40 from the side of the front cover 11.

The following is a description of means for supplying a cutting fluid to the first and second slope parts.

A cutting fluid supply channel through which the cutting fluid is supplied to the first and second slope parts comprises a cutting fluid supply passage 4 and left and right cutting fluid supply passages 31 and 32. The cutting fluid supply passage 4 extends from a cutting fluid supply device 2 to the cover 1 (or is located outside the cover 1). In contrast, the left and right cutting fluid supply passages 31 and 32 are arranged inside the cover 1. Further, the left cutting fluid supply passage 31 comprises first and third cutting fluid supply nozzles 33 and 35 configured to discharge the cutting fluid onto the slopes of the first and second slope parts, respectively. The right cutting fluid supply passage 32 comprises second and fourth cutting fluid supply nozzles 34 and 36 configured to discharge the cutting fluid onto the slopes of the first and second slope parts, respectively.

With this configuration, if chips 37 produced by machining are deposited on the surfaces of the first and second lower cover bottom members 7 and 8 that constitute the first slope part, they are discharged onto the left and right space covers 9 and 10 that constitute the second slope part by the cutting fluid supplied from the first and second cutting fluid supply nozzles 33 and 34 (FIG. 1).

If the case where the left and right lower cover bottom surfaces 17 and 18 are used for the second slope part, the chips 37 deposited on the surface of the first slope part (first and second lower cover bottom members 7 and 8) are discharged onto the lower cover bottom surfaces 17 and 18 by the cutting fluid supplied from the first and second cutting fluid supply nozzles 33 and 34.

In this embodiment, the chips 37 discharged from the first slope part onto the left and right space covers 9 and 10 or the left and right lower cover bottom surfaces 17 and 18, along with the chips 37 directly deposited on the left and right space covers 9 and 10, are discharged into the cutting fluid supply device 2 (contaminated fluid tank 26) by the cutting fluid supplied from the third and fourth cutting fluid supply nozzles 35 and 36.

Figure 3:
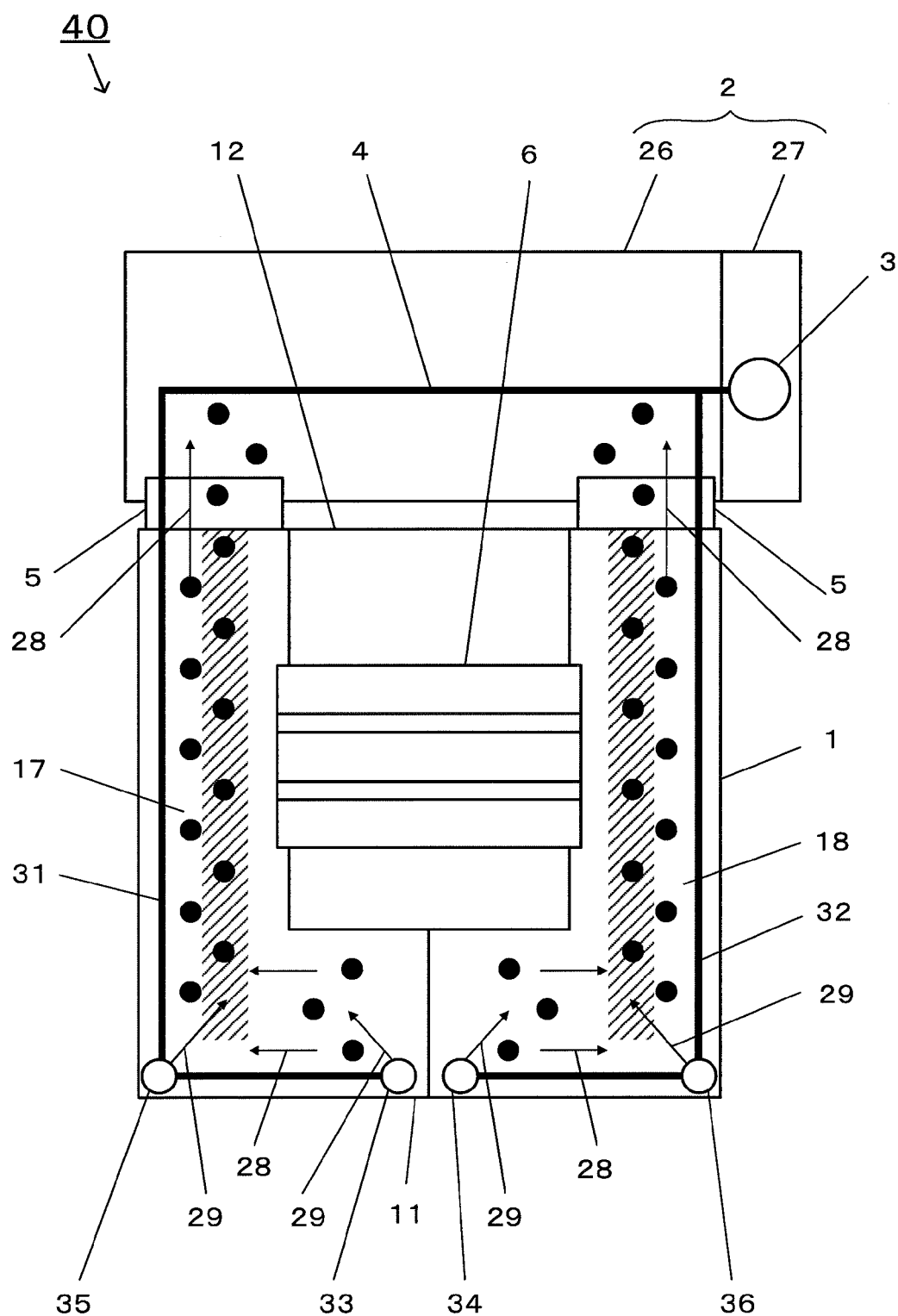
FIG. 3 is a schematic top view of Embodiment 2 of the machine tool according to the present invention.
Figure 4:
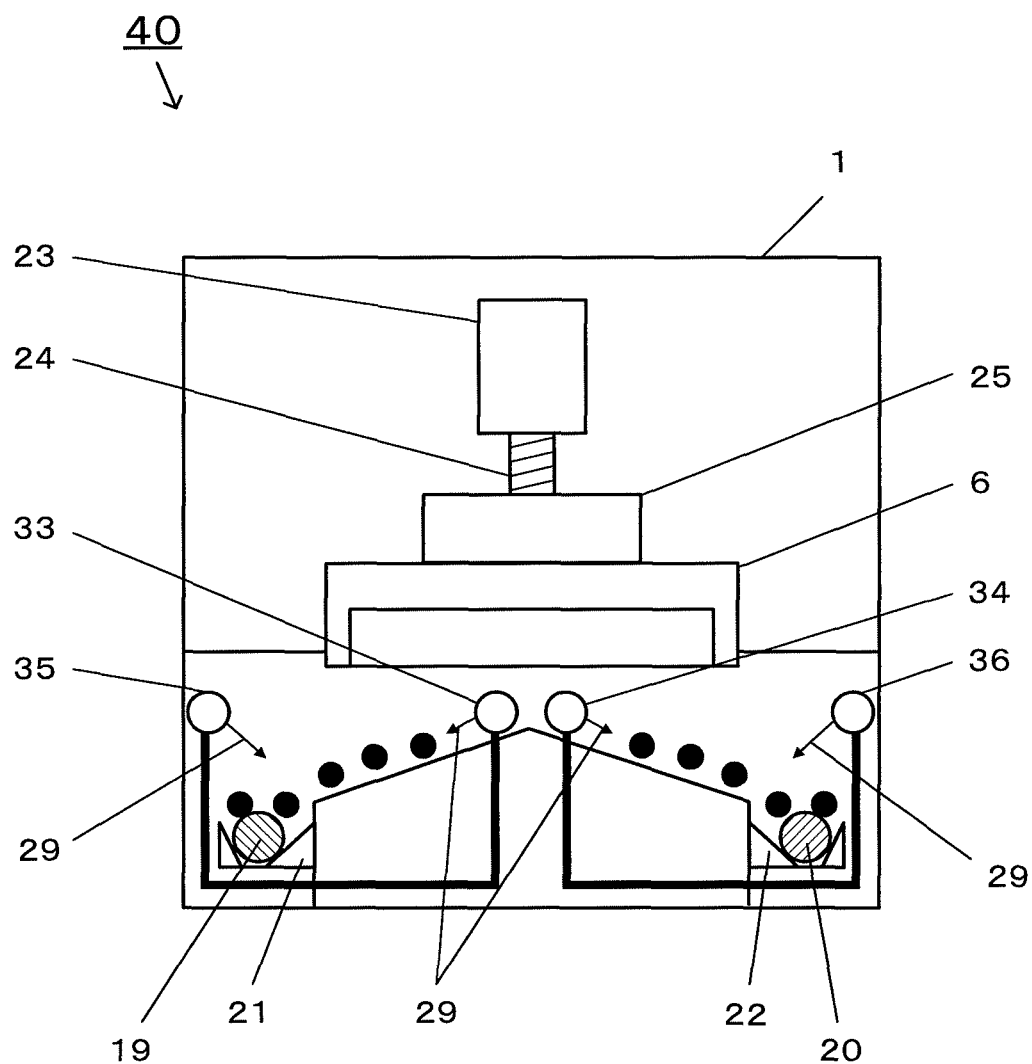
FIG. 4 is a schematic front view of Embodiment 2 of the machine tool according to the present invention.

Embodiment 2 of the machine tool according to the present invention will now be described with reference to FIGS. 3 and 4.

In this embodiment, a chip discharge device is disposed on the second slope part of Embodiment 1. A description of the same constructions of Embodiment 2 as those of Embodiment 1 is omitted.

Left and right screw conveyors 19 and 20 constitute the chip discharge device, while left and right screw plates 21 and 22 constitute an auxiliary member that guides chips 37 to the chip discharge device. The screw plates 21 and 22 are not limited to the cross-sectional shape shown in FIG. 4 and may alternatively be in a semicircular cross-sectional shape or another shape.

In this embodiment, the chips 37 discharged from a first slope part (first and second lower cover bottom members 7 and 8) onto a second slope part (left and right lower cover bottom surfaces 17 and 18) or the auxiliary member (left and right screw plates 21 and 22), along with the chips 37 directly deposited on the second slope part and the auxiliary member, are discharged into a cutting fluid supply device 2 by a cutting fluid supplied from the left and right screw conveyors 19 and 20 and third and fourth cutting fluid supply nozzles 35 and 36. A cutting fluid in a contaminated fluid tank 26 is cleaned by a filter (not shown) and pooled in a clean fluid tank 27. A cutting fluid supply pump 3 draws up the cutting fluid in the clean fluid tank 27 and introduces it into left and right cutting fluid supply passages 31 and 32 inside the cover 1 through a cutting fluid supply passage 4 outside the cover 1. Then, the cutting fluid is discharged from the first to fourth cutting fluid supply nozzles 33 to 36 into a machining space.

In the machine tool according to the present invention constructed in this manner, the nozzles for supplying the cutting fluid are provided individually for the slopes such that the cover bottom surfaces on which chips are deposited are inclined at a large angle without complicating the structure. Thus, the chips that are conventionally liable to be deposited on the front surface portion or corner portions of the table can be reliably and efficiently discharged and collected in the cutting fluid supply device. Further, the cover that covers the machine tool can be used in common without regard to the presence of screw conveyors, based on minimum change of parts.

The invention claimed is:

1. A machine tool, comprising:
    a bed;
    a table on which a workpiece is to be placed;
    a column comprising a spindle to be fitted with a tool for machining the workpiece, the table and the spindle being disposed on the bed;
    a cover comprising:
        a front cover provided on a side opposite the column with the table therebetween, side covers provided on left and right sides of the front cover, respectively, and
        a bottom part connected to the bed through respective lower ends of the front cover and the side covers;
    a first slope part provided between the front cover and the table, and comprising first left and right slopes declining from a center of the front cover toward the left and right side covers, respectively;
    a second slope part comprising second left and right slopes connected to lower ends of the first left and right slopes, respectively, the second left and right slopes declining rearward relative to the machine tool away from the front cover;
    a first left nozzle and a first right nozzle provided individually at a top of the first left slope and at a top of the first right slope, respectively, the first left and right nozzles configured to discharge a cutting fluid onto the first left and right slopes, respectively; and
    a second left nozzle and a second right nozzle provided individually at a top of the second left slope and at a top of the second right slope, respectively, the second left and right nozzles configured to discharge the cutting fluid onto the second left and right slopes, respectively,
    wherein
        the first slope part and the second slope part are arranged below the table,
        the second slope part comprises
            left and right screw-conveyor-receiving spaces configured to receive screw conveyors, respectively, and
            left and right space covers attachable to and detachable from the cover, and
        when no screw conveyors are received in the left and right screw-conveyor-receiving spaces, the left and right space covers are attached to the cover to cover the left and right screw-conveyor-receiving spaces and define the second left and right slopes, respectively.

2. The machine tool according to claim 1, wherein the first slope part is a member attachable to and detachable from the bottom part connected to the bed through the lower end of the front cover.

3. The machine tool according to claim 2, further comprising:
    left and right screw conveyors received in the left and right screw-conveyor-receiving spaces, respectively,
    wherein the left and right space covers are detached from the cover to permit discharge of the cutting fluid and chips onto the left and right screw conveyors received in the left and right screw-conveyor-receiving spaces, respectively.

4. The machine tool according to claim 3, further comprising:
    left and right auxiliary members configured to guide the chips to the left and right screw conveyors, respectively, and disposed near the left and right screw conveyors, respectively.

5. The machine tool according to claim 2, further comprising:
    a cutting fluid supply channel configured to supply the cutting fluid to the first left and right nozzles and the second left and right nozzles.

6. The machine tool according to claim 1, wherein the first slope part is formed as the bottom part connected to the bed through the front cover.

7. The machine tool according to claim 6, further comprising:
    left and right screw conveyors received in the left and right screw-conveyor-receiving spaces, respectively,
    wherein the left and right space covers are detached from the cover to permit discharge of the cutting fluid and chips onto the left and right screw conveyors received in the left and right screw-conveyor-receiving spaces, respectively.

8. The machine tool according to claim 7, further comprising:
    left and right auxiliary members configured to guide the chips to the left and right screw conveyors, respectively, and disposed near the left and right screw conveyors, respectively.

9. The machine tool according to claim 6, further comprising:
    a cutting fluid supply channel configured to supply the cutting fluid to the first left and right nozzles and the second left and right nozzles.

10. The machine tool according to claim 1, wherein the second slope part is positioned above the bottom part with a space between the second slope part and the bottom part.

* * * * *